(12) United States Patent
Wada

(10) Patent No.: US 6,502,795 B2
(45) Date of Patent: Jan. 7, 2003

(54) DISPLAY APPARATUS

(75) Inventor: Atsuko Wada, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/105,913

(22) Filed: Mar. 25, 2002

(65) Prior Publication Data

US 2002/0096612 A1 Jul. 25, 2002

Related U.S. Application Data

(62) Division of application No. 09/507,265, filed on Feb. 18, 2000, now Pat. No. 6,446,925.

(30) Foreign Application Priority Data

Feb. 26, 1999 (JP) .............................................. 11-051749

(51) Int. Cl.[7] .............................. E04G 3/00; G09G 3/36
(52) U.S. Cl. ................................ 248/286.1; 248/291.1; 345/87
(58) Field of Search .............................. 248/286.1, 685, 248/686, 284.1, 291.1, 27.1, 27.3, 295.11, 288.31, 288.51, 298.1, 917, 320; 345/87; 296/37.7

(56) References Cited

U.S. PATENT DOCUMENTS

| | | | | |
|---|---|---|---|---|
| 4,639,106 A | * | 1/1987 | Gradin | 353/13 |
| 4,824,159 A | * | 4/1989 | Fluharty et al. | 248/278.1 X |
| 5,096,271 A | * | 3/1992 | Portman | 312/7.2 |
| 5,145,128 A | * | 9/1992 | Umeda | 244/118.5 |
| 5,927,784 A | * | 7/1999 | Vitito | 296/37.7 |
| 6,157,418 A | * | 12/2000 | Rosen | 348/837 |
| 6,256,078 B1 | * | 7/2001 | Ogata | 349/58 |
| 6,364,390 B1 | * | 4/2002 | Finneman | 296/37.7 |

* cited by examiner

Primary Examiner—Anita King
(74) Attorney, Agent, or Firm—Crosby, Heafey, Roach & May

(57) ABSTRACT

A display apparatus includes a supporting device for rotatably engaging a display device and a housing device and a disengaging device so that the display device may be easily and speedily attached to or detached from the housing device. A display apparatus includes supporting portions (30, 31) and supported portions (32, 33) serving as a supporting device for rotatably engaging a display device (10) and a housing device (20) and a disengaging device (40) for disengaging the engagement between the display device (10) and the housing device (20) and in which the disengaging device (40) disengages the engagement between the supporting portions (30, 31) and the supported portions (32, 33) to thereby disengage the engagement between the display device (10) and the housing device (20).

2 Claims, 14 Drawing Sheets

FIG. 1 (PRIOR ART)
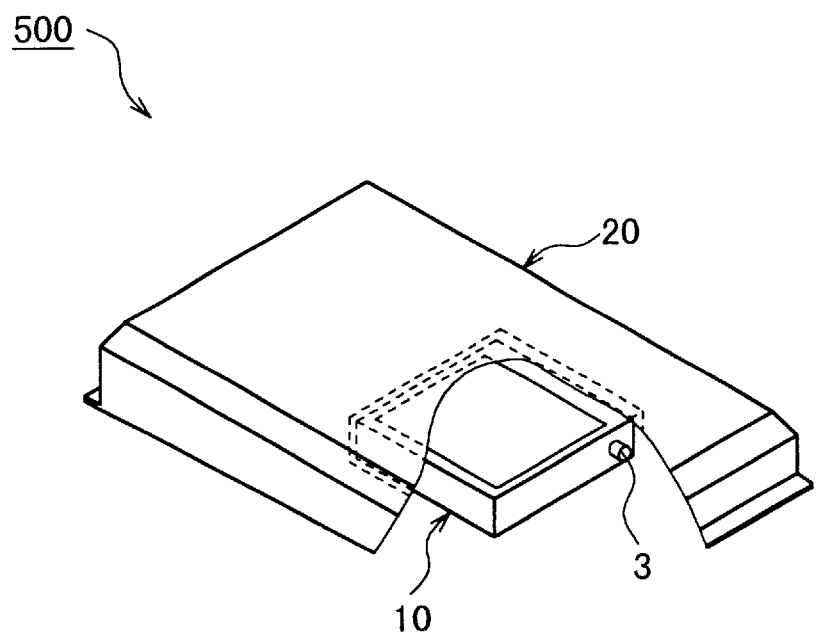
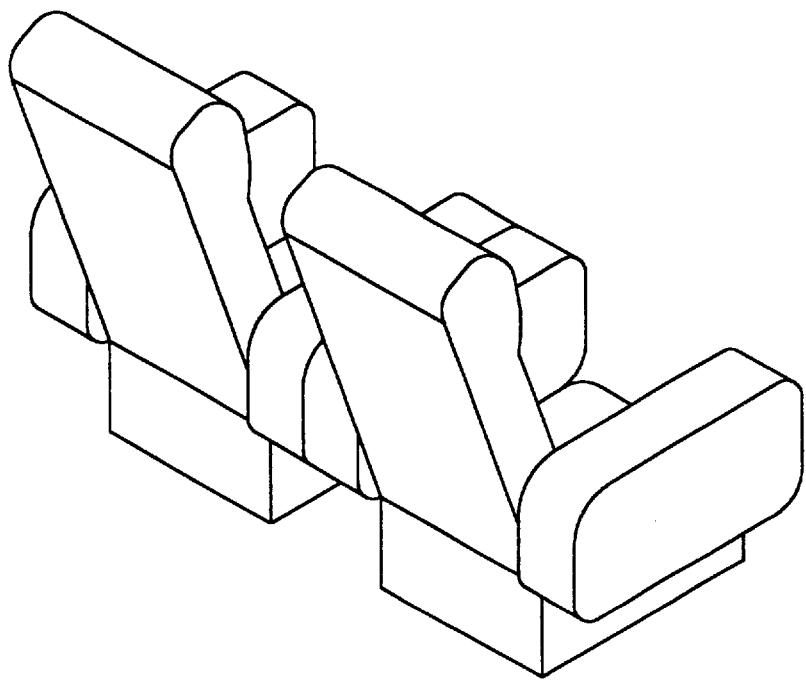

FIG. 2 (PRIOR ART)
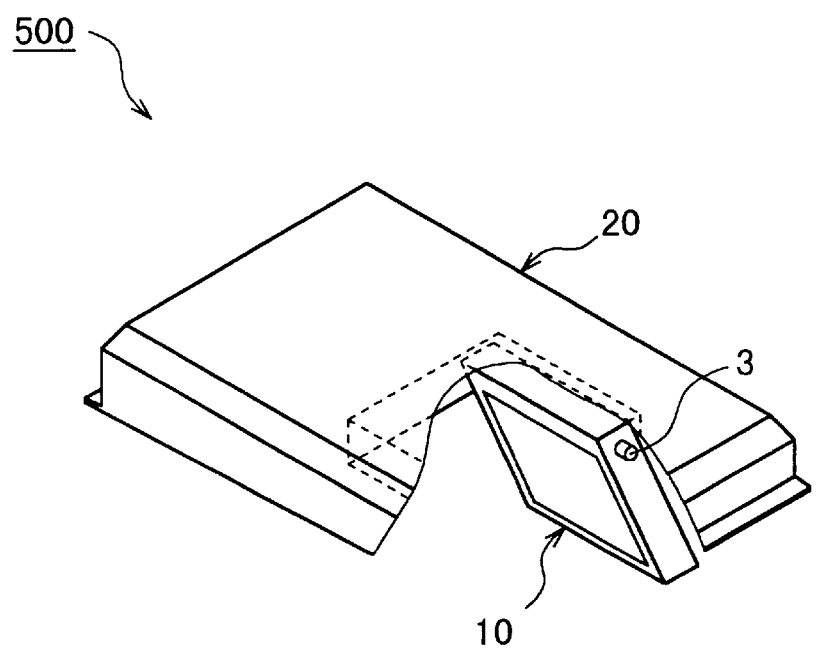
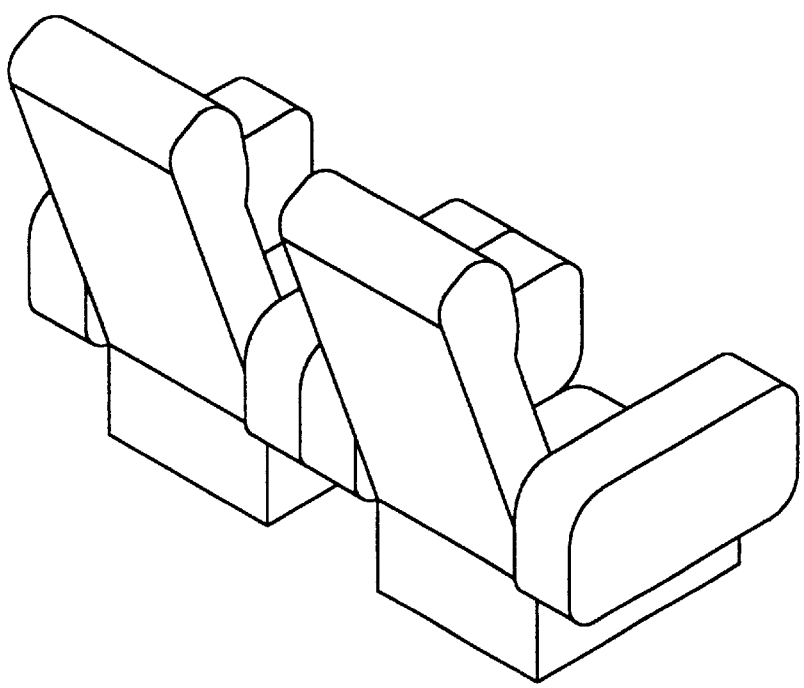

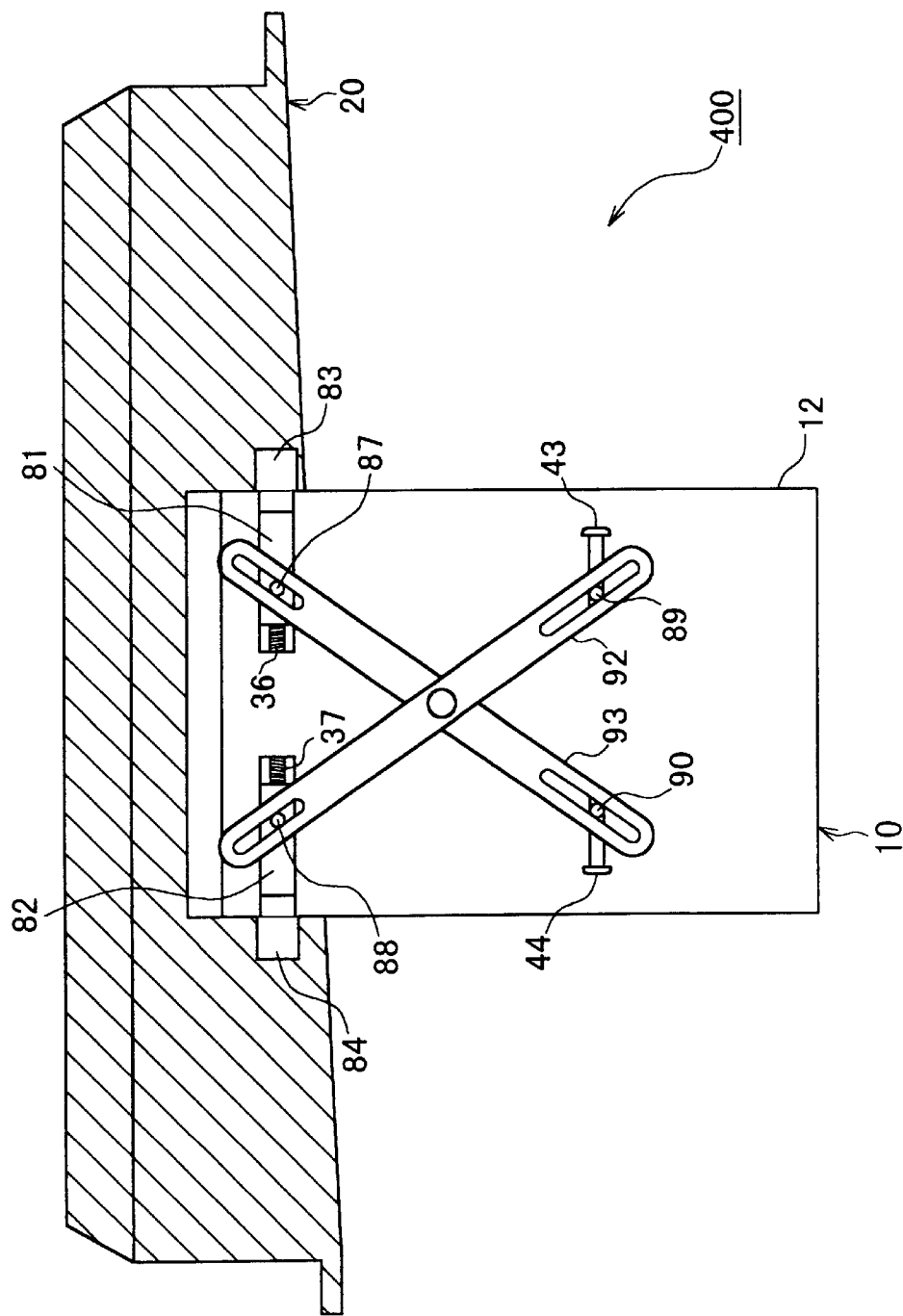

DISPLAY APPARATUS

BACKGROUND OF THE INVENTION

This is a divisional of application Ser. No. 09/507,265 filed Feb. 18, 2000, which is hereby incorporated by reference.

FIELD OF THE INVENTION

The present invention generally relates to a display apparatus in which a display means such as a liquid-crystal display (LCD) monitor may be detachably and rotatably housed in a housing means of a predetermined shape disposed at a suitable position such as a wall or a ceiling of a passenger cabin of an airplane or the like. More particularly, this invention relates to a display apparatus comprising a supporting means including a supporting portion and a supported portion to engage a display means and a housing means with each other and a disengaging means for disengaging the engagement of the display means and the housing means so that the display means may be attached to or detached from the housing means easily and speedily.

DESCRIPTION OF THE RELATED ART

Recently, display apparatus such as a liquid-crystal display device for displaying a variety of information have become more available within the passenger cabin of the airplane and the like. This kind of display apparatus has hitherto been large in size and designed such that it may be watched by many passengers on the passenger seats. As the display apparatus becomes smaller in size in accordance with the progress of technologies, in order to satisfy, most of passenger's needs, the display apparatus is designed such that it may be watched by a small number of passengers. Moreover, in order to secure a sufficient cabin space, there is proposed a display apparatus in which a display means may be housed. As the display apparatus becomes smaller in size and the function of the display apparatus is advanced much more, a number of display apparatus are provided within the passenger cabin of the airplane. In order to easily and quickly change and maintain many display means of the display apparatus, there have been developed such display apparatus in which a display means may be freely attached to or detached from a housing means.

FIG. 1 of the accompanying drawings is a partly-cross-sectional perspective view illustrating a display apparatus 500 according to the related art. FIG. 2 is a like partly-cross-sectional perspective view illustrating the state in which the display apparatus 500 is in use.

In the display apparatus 500, shown in FIG. 1, a display means 10 includes a liquid-crystal display screen for displaying a variety of information and a fixed shaft 3 serving as a supporting means. A housing means 20 is disposed on the ceiling of the passenger cabin so as to house the display means 10. When the fixed shaft 3 fixed to this display means 10 is pivotally fitted into the housing means 20, the display means 10 is rotatably engaged with the housing means 20, whereby the display means 10 may be ejected from the housing means 20 or the display means 10 may be freely accommodated into the housing means 20.

When the display means 10 is in use, as shown in FIG. 2, a passenger pulls out the display means 10 to a predetermined position and a passenger may use the display means 10. When the display means 10 is detached from the display apparatus 500, initially, the housing means 20 is detached from the ceiling of the passenger cabin or the like. Thereafter, the display means 10 is detached from the housing means 20.

However, according to the display apparatus 500 of the related art, when the display means 10 is detached from the display apparatus 500, the housing means 20 is detached from the ceiling of the passenger cabin or the like, and then the display means 10 is detached from the housing means 20.

As a consequence, in order to change and maintain the display means, there is required a large-scale work in which, the display means 10 is attached to or detached from the display apparatus 500. Moreover, such work can be done by only those (qualified persons) who are certified by Federal Aviation Administration (FAA).

SUMMARY OF THE INVENTION

It is an object of the present invention to provide a display apparatus including a supporting means for rotatably engaging a display means and a housing means with each other and a disengaging means so that the display means may be attached to or detached from the housing means easily and speedily.

According to an aspect of the present invention, there is provided a display apparatus in which a display means may be freely attached to or detached from a housing means of a predetermined shape and the display means may be rotatably accommodated into the housing means. This display apparatus comprises a display means, a housing means for housing this display means, a supporting means for engaging the housing means and the display means in such a manner that the display means may be freely attached to or detached from the housing means and engaging the housing means and the display means in such a manner that the display means and the housing means may be engaged rotatably and a disengaging means for disengaging the engagement between the display means and the housing mans. The supporting means includes a supporting portion and a supported portion. The display means and the housing means are engaged with each other by engaging the supporting portion and the supported portion. The disengaging means rectilinearly moves the supporting portion away from the supported portion, thereby resulting in the engagement, between the display means and the housing means being disengaged.

According to the present invention, when the supporting portion and the supported portion comprising the supporting means are engaged with each other, the display means may be rotatably engaged with the housing means. When the disengaging means rectilinearly moves the supporting portion away from the supported portion, the supporting portion and the supported portion are isolated from each other, thereby resulting in the engagement between the display means and the housing means being disengaged. Thus, the display means may be removed from the housing means. When the display means is attached to the housing means, under the condition that the supporting portion is rectilinearly moved in the direction in which the supporting portion becomes distant from the supported portion, the engagement positions of the supported portion and the supporting portion are made coincident with each other. Then, when the supporting portion is rectilinearly moved to the original position, the supporting portion and the, supported portion are engaged with each other, whereby the display means may be attached to the housing means. Therefore, it is possible to provide a display apparatus in which the display means may be attached to or detached from the housing means easily and speedily.

BRIEF DESCRIPTION OF THE DRAWINGS

FIG. 1 is a partly-cross-sectional perspective view showing a display apparatus 500 according to the related art;

FIG. 2 is a partly-cross-sectional perspective view showing the state in which the display apparatus 500 is in use;

FIG. 15 is a cross-sectional view showing the manner in which the display apparatus 400 is disengaged.

DESCRIPTION OF THE PREFERRED EMBODIMENTS

Display apparatus according to the embodiments of the present invention will hereinafter be described with reference to the drawings.

Figure 3:
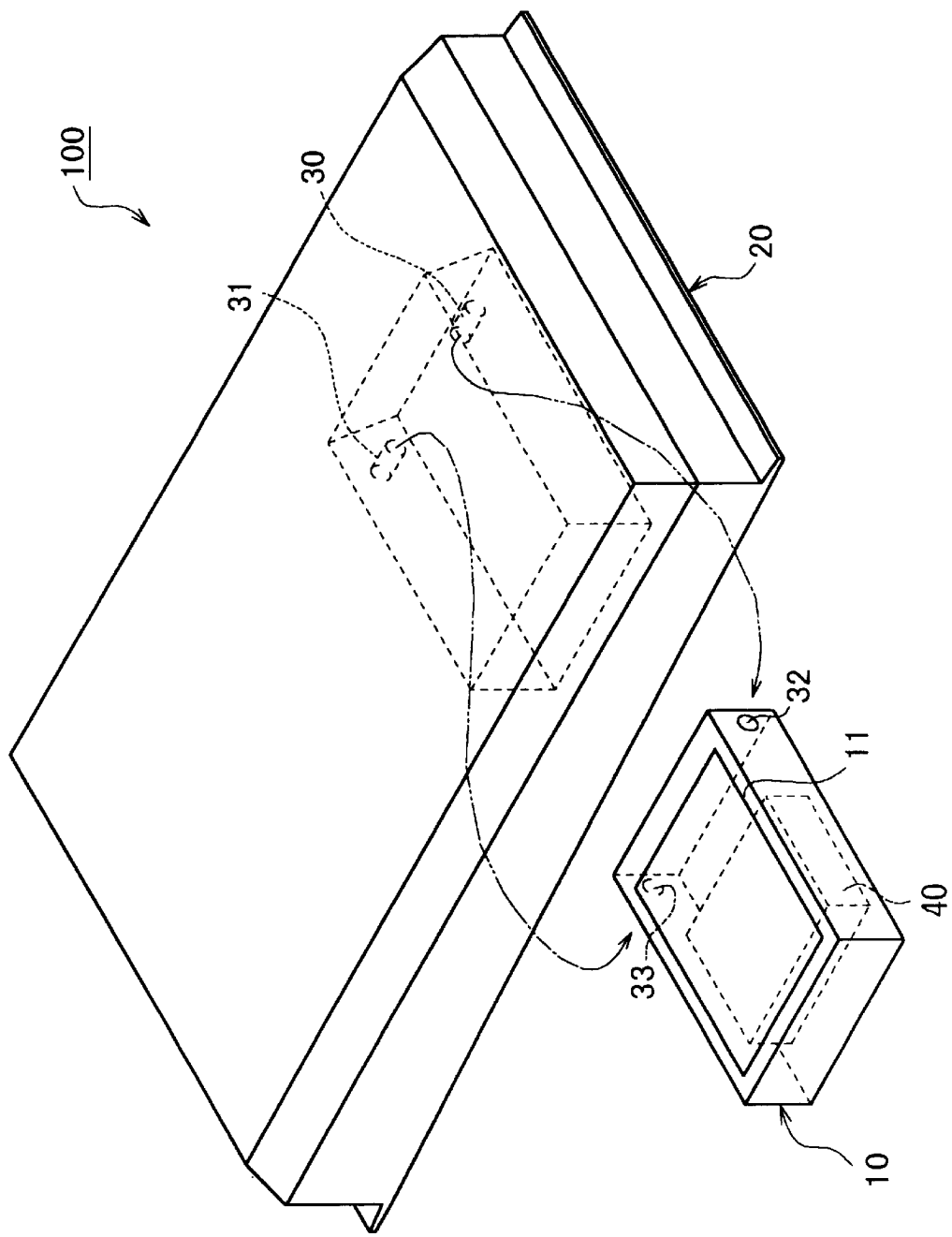
FIG. 3 is a perspective view showing a display apparatus 100 according to a first embodiment of the present invention.

(1) First Embodiment:

FIG. 3 is a perspective view showing a display apparatus 100 according to a first embodiment of the present invention. In this embodiment, the display apparatus 100 comprises a supporting means including a supporting portion and a supported portion for engaging a display means and a housing means and a disengaging means for disengaging the engagement between the display means and the housing means to thereby enable the display means to be detached from the housing means easily and speedily.

The display apparatus 100 shown in FIG. 3 may be attached to a wall, a ceiling or the like. The display means 10 might be formed of a suitable means such as a liquid-crystal display (hereinafter simply referred to as LCD) or a plasma display panel (hereinafter simply referred to as PDP).

In this embodiment, the display apparatus 100 shown in FIG. 3 includes the display means 10 having a disengaging means 40 disposed therein, a housing means 20 and a supporting means. The housing means 20 houses the display means 10, the supporting means engages the housing means 20 and the display means 10 in such a manner that the display means 10 may become rotatable relative to the housing means 20, and the disengaging means 40 disengages the engagement between the display means 10 and the housing means 20. The display means 10 has a display screen 11 such as an LCD or a PDP disposed on its surface opposing the housing means 20 when the display means 10 is housed within the housing means 20.

The supporting means comprises supporting portions 30, 31 and supported portions 32, 33. The supporting portion 30 disposed on the housing means 20 are rotatably engaged with the supported portion 32 disposed on the display means 10 and the supporting portion 31 disposed on the housing means 20 are rotatably engaged with the supported portion 33 disposed on the display means 10, whereby the display means 10 are rotatably engaged with the housing means 20. When the engagement between the supporting portion 30 and the supported portion 32 is disengaged by the disengaging means 40 and the engagement between the supporting portion 31 and the supported portion 33 is disengaged by the disengaging means 40, the display means 10 is disengaged from the housing means 20. The supporting portions 30, 31 and the supported portions 32, 33 may be positioned freely, i.e. the supporting portions 30, 31 and the supported portions 32, 33 may be disposed on either of the display means 10 and the housing means 20 so long as the supporting portion 30 is opposed to the supported portion 32 and the supporting portion 31 is opposed to the supported portion 33.

Figure 4:
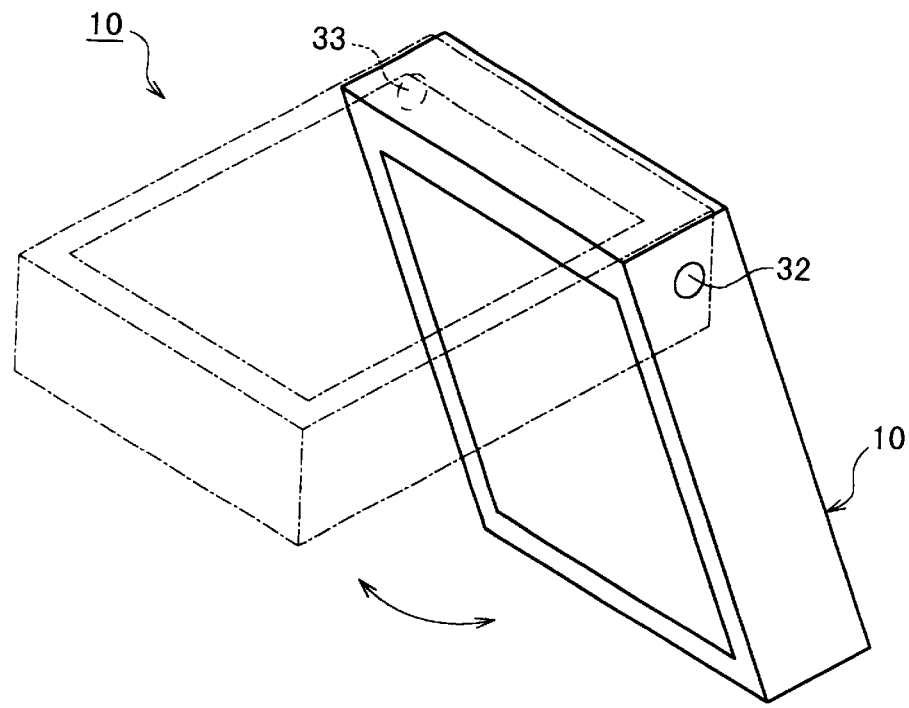
FIG. 4 is a perspective view showing the manner in which a display means 10 is pulled out of a housing means and the display means 10 is housed into the housing means.

FIG. 4 is a perspective view showing the state in which the display means 10 is in use or the display means 10 is not in use. In FIG. 4, a solid-line shows the state in which the display means 10 is pulled out of the housing means 20 (not shown), and a dot-and-dash line shows the state in which the display means 10 is housed into the housing means 20 (not shown). The display means 10 may freely rotate about the supported portions 32, 33 as shown in FIG. 4.

Figure 5:
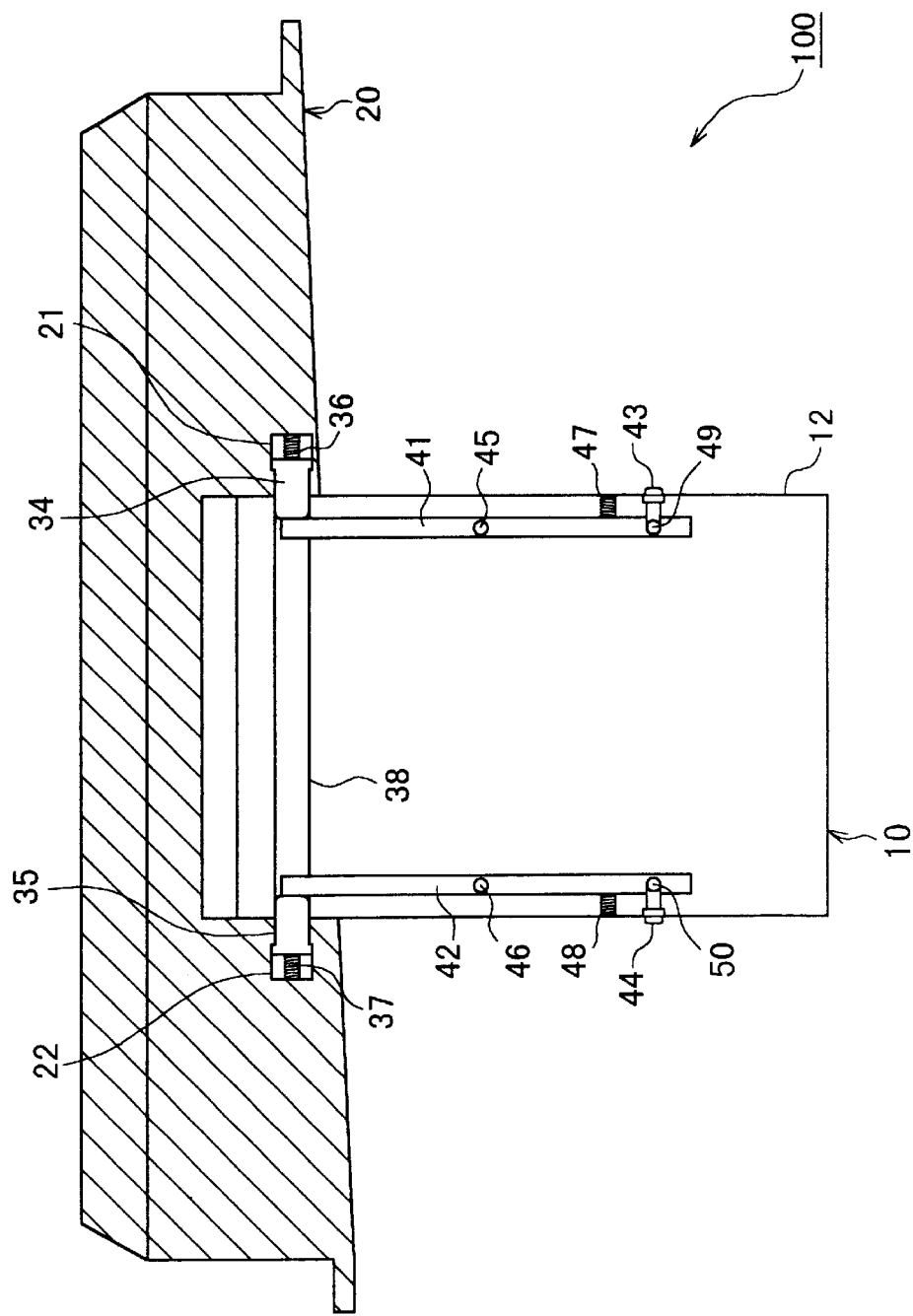
FIG. 5 is a cross-sectional view showing the inside of the display apparatus 100.

FIG. 5 is a cross-sectional view showing the in side of the display apparatus 100. As shown in FIG. 5, the housing means 20 has a recessed portion to receive the display means 10, and is attached to an opening portion which is previously prepared in a ceiling or the like, for example. This housing means 20 has pinch holes 21, 22, for example, opposed to respective side surfaces of the inside of the recessed portion of the housing means 20.

As an example of the supporting portions 30, 31 shown in FIG. 3, a pinch 34 is loosely fitted into the pinch hole 21 through a compression coil spring 36, for example, which is a resilient material. A pinch 35 is loosely fitted into the pinch hole 22 through a compression coil spring 37, for example, which is a resilient material as shown in FIG. 5. Thus, when the compression coil springs 36, 37 are pressed in the compression direction, the pinches 34, 35 are rectilinearly moved away from the original positions, respectively. When the compression coil springs 36, 37 are released from being pressed, the pinches 34, 35 are rectilinearly moved to the original positions under restitutive force of the compression coil springs 36, 37. The pinches 34, 35, the pinch holes 21, 22 and the compression coil springs 36, 37 will be described more fully later with reference to FIG. 6.

As shown in FIG. 5, the display means 10 has a display casing 12. The display means 10 includes a supporting socket 38, for example, formed at the positions in which the supporting socket 38 may be engaged with fine pinches 34, 35 so as to become freely rotatable as an assembly which results from integrally molding the supported portions 32, 33 shown in FIG. 3. When the pinches 34, 35 are inserted into the supporting socket 38 from the respective sides, the supporting socket 38 may be engaged with the pinches 34, 35 so as to become freely rotatable. When the pinches 34, 35 are ejected from the supporting socket 38, the supporting socket 38 is disengaged from the pinches 34, 35. In this embodiment, although the supporting socket 38 is integrally formed so as to become rotatably engaged with both of the pinches 34, 35, the present invention is not limited thereto, and two supporting sockets 38 may be individually provided so as to become rotatably engaged with the pinches 34 and 35, for example.

The disengaging means 40, disposed within the display means 10 shown in FIG. 3, includes swing bars 41, 42 as an example of a disengaging portion and push buttons 43, 44, for example, as disengaging switches as shown in FIG. 5. The push buttons 43, 44 disposed on the side wall of the display casing 12 are switches that are used to disengage the display means 10 from the housing means 20. The push buttons 43, 44 are operated by a user in a manual fashion. Although the push buttons 43, 44 are disposed on the side wall of the display casing 12 as described above, the positions at which the push buttons 43, 44 are disposed are not limited thereto, and the push buttons 43, 44 may be freely located at any positions so long as the push buttons 43, 44 become easy to handle.

As shown in FIG. 5, one end of this swing bar 41 is brought in contact with the pinch 34, and the other end thereof is engaged with the push button 43 by an engagement pin 49. Also, one end of the swing bar 42 is brought in contact with the pinch 35, and the other end thereof is engaged with the push button 44 by an engagement pin 50. Thus, the swing bars 41, 42 are operated in unison with the push buttons 43, 44. This swing bar 41 is engaged with the display casing 12 by a fulcrum pin 45, and the swing bar 42 is engaged with the display casing 12 by a fulcrum pin 46. Based on leverage, the depression of the push button 43 is transmitted to the pinch 34 through the swing motion of the swing bar 41, and the depression of the push button 44 is transmitted to the pinch 35 through the swing motion of the swing bar 42.

Specifically, when the swing bar 41 moves the pinch 34 away from the supporting socket 38 in the rectilinear direction and the swing bar 42 moves the pinch 35 away from the supporting socket 38 in the rectilinear direction, the pinches 34, 35 are ejected from the supporting socket 38, thereby resulting in the pinches 34, 35 and the supporting socket 38 being disengaged from each other. The disengaging mechanism based on the swing bars is not limited to the above-mentioned disengaging mechanism, and any disengaging mechanism may be used so long as it may achieve the same effects.

As shown in FIG. 5, one end of a tension coil spring 47, for example, serving as a resilient member is attached to the swing bar 41, and the other end thereof is attached to the display casing 12. One end of a tension coil spring 48, for example, serving as a resilient member is attached to the swing bar 42, and the other end thereof is attached to the display casing 12. The swing bar 41 and the push button 43 which were displaced by the manual operation are returned to the original positions by the restitutive force of the tension coil spring 47. Also, the swing bar 42 and the push button 44 which were displaced by the manual operation are returned to the original positions by the restitutive force of the tension coil spring 48.

Figure 6:
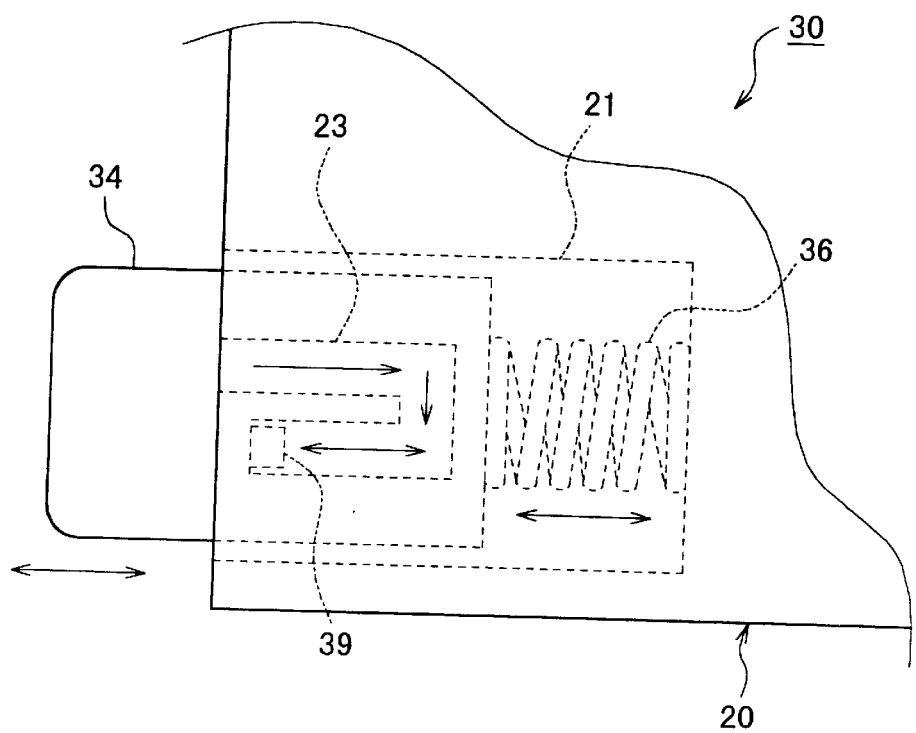
FIG. 6 is a side view showing a supporting portion 30 of the display apparatus 100.

FIG. 6 is a side view showing the configuration of the supporting portion 30 according to the first embodiment of the present invention. In this embodiment, as shown in FIG. 6, the pinch 34 has a convex portion 39 formed on its side surface. A concave portion 23 which is engaged with the convex portion 39 is formed on the inner side surface of the pinch hole 21 in a U-letter fashion. In the concave portion 23 having the U-letter shape, of the two opposing sides, the tip end of one side is opened, and the tip end of the other side is closed. As a consequence, the convex portion 39 disposed on the pinch 34 is inserted from the opened tip end of one side of the concave portion 23 disposed on the pinch hole 21 and the convex portion 39 is moved into the closed tip end of the other side of the concave portion 23 by rotating the pinch 34 relative to the pinch hole 21, whereby the pinch 34 and the pinch hole 21 are engaged with each other so that they may be moved in the rectilinear direction.

Since the pinch 34 and the pinch hole 21 are engaged with each other by the compression coil spring 36, the pinch 34 is moved in the rectilinear direction by the swing motion of the swing bar 41 shown in FIG. 5. Thereafter, when the pinch 34 is released from being pressed by the swing motion of the swing bar 41, the pinch 34 is rectilinearly moved to the original position by the restitutive force of the compression coil spring 36. The number of the convex portion 39 and the number of the concave portion 23 are not limited to those mentioned above, and may be changed freely. Moreover, the pinch 35, the pinch hole 22 and the compression coil spring 37 comprising the supporting portion 31 shown in FIG. 3 are arranged and operated similarly as described above.

An example of an operation of the display apparatus 100 according to the first embodiment of the present invention will be described next.

Figure 7:
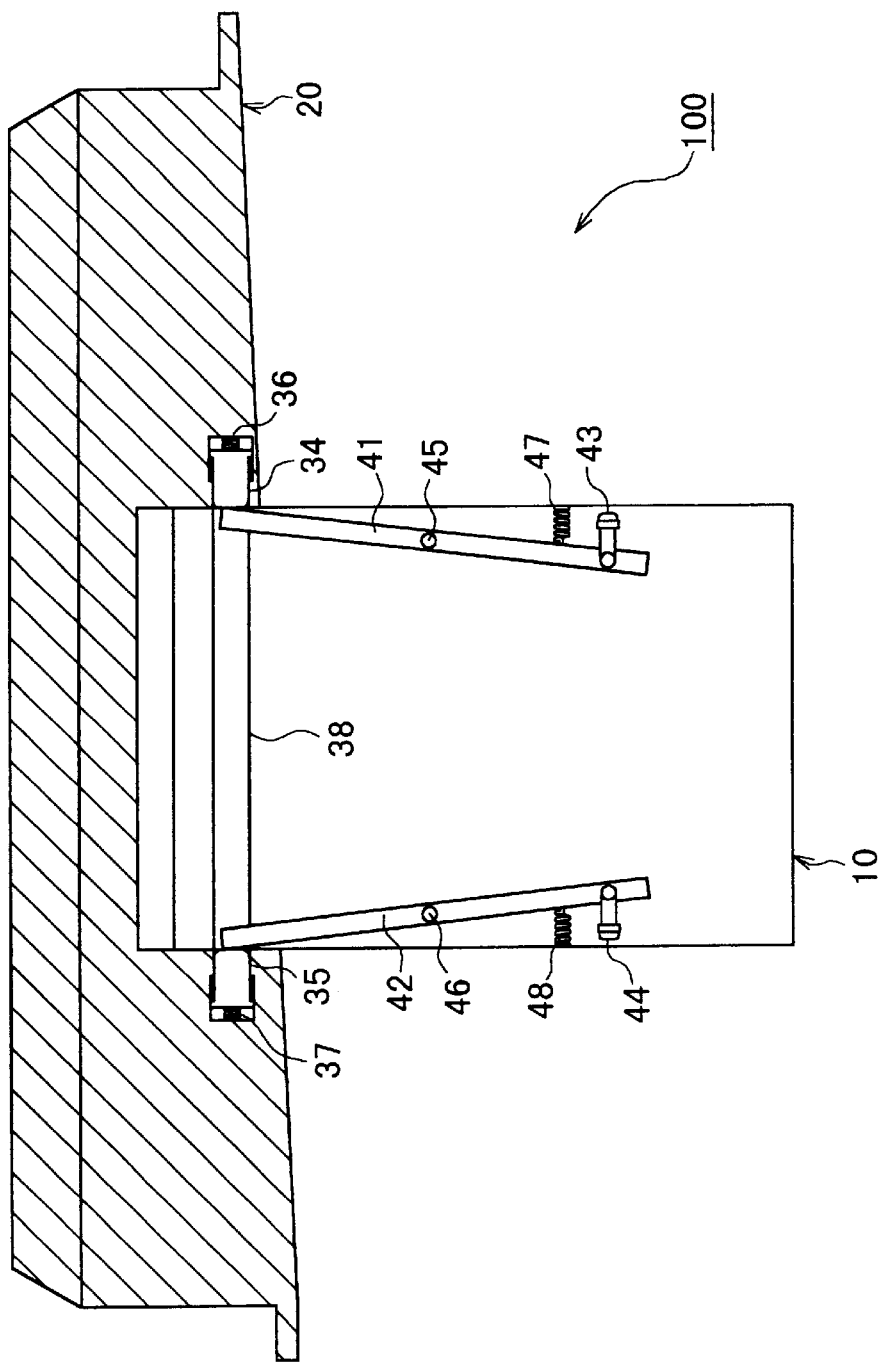
FIG. 7 is a cross-sectional view showing the manner in which the display apparatus 100 is disengaged.
Figure 8:
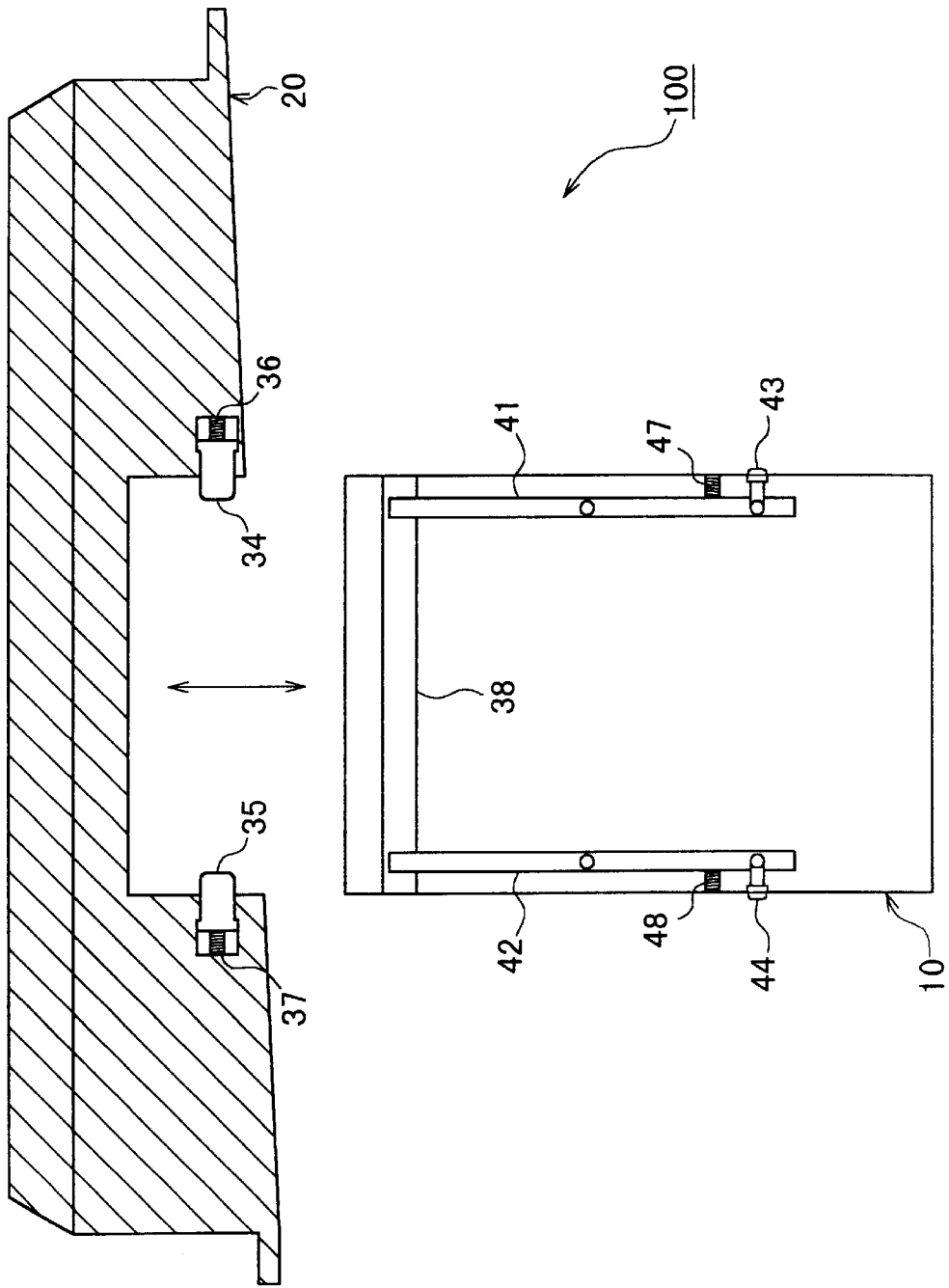
FIG. 8 is a cross-sectional view showing the manner in which the display apparatus 100 is detached.

FIG. 7 is a cross-sectional view showing the manner in which the display apparatus 100 is disengaged from the housing means 20. FIG. 8 is a cross-sectional view showing the manner in which the display apparatus 100 is detached from the housing means 20. In this embodiment, when the push button 43 engaged with one end of the swing bar 41 shown in FIG. 7 is depressed manually, the swing bar 41 extends the tension coil spring 47 in unison with the depression of the push button 43 and the swing bar 41 swings about the fulcrum pin 45 owing to the leverage. As a result, while compressing the compression coil spring 36 in the direction in which the pinch 34 in contact with the other end of the swing bar 41 is moved away from the supporting socket 38, i.e. in the direction in which the display means 10 is being inserted into the housing means 20, the swing bar 41 moves the pinch 34 in fine rectilinear direction to thereby disengage the pinch 34 from the supporting socket 38.

Similarly, when the push button 44 engaged with one end of the surfing bar 42 is pressed manually, the swing bar 42 extends the tension coil spring 48 in unison with the depression of the push button 44 and the swing bar 42 swings about the fulcrum pin 46 owing to the leverage. As a result, while compressing the compression coil spring 37 in the direction in which the pinch 35 in contact with the other end of the swing bar 42 is moved away from the supporting socket 38, i.e. in the direction in which the display means 10 is being inserted into the housing means 20, the swing bar 42 moves the pinch 35 in the rectilinear direction to thereby disengage the pinch 35 from the supporting socket 38.

That is, during the push button 43 is being depressed continuously, the pinch 34 is disengaged from the supporting socket 38 so that the pinch 34 and the supporting socket 38 are disengaged from each other. In a like manner, during the push button 44 is being depressed continuously, the pinch 35 is disengaged from the supporting socket 38 so that the pinch 35 and the supporting socket 38 are disengaged from each other. Therefore, since the display means 10 and the housing means 20 also are disengaged from each other, the display means 10 may be detached from the housing means 20.

When the display means 10 is detached from the housing means 20, the compression coil spring 36 shown in FIG. 8 rectilinearly moves the pinch 34 to the original position by the restitutive force, and the compression coil spring 37 rectilinearly moves the pinch 35 to the original position by the restitutive force. When the push buttons 43, 44 are released from being depressed manually, the tension coil spring 47 moves the push button 43 and the scaring bar 41, each of which is displaced by the manual operation, to the original positions by the restitutive force, and the tension coil spring 48 moves the push button 44 and the swing bar 42, each of which is displaced by the manual operation, to the original positions by the restitutive force.

When the display means 10 is attached to the housing means 20, one pinch 34, for example, is pushed into the housing means 20 on the side surface of the display casing 12 (not shown). Thereafter, the other pinch 35 is pushed into the housing means 20, the display means 10 is fitted into both side surfaces of the concave inner surface of the housing means 20 and the positions of the pinches 34, 35 and the supporting socket 38 are made coincident with each other, whereby the pinch 34 is rectilinearly moved to the original position by the restitutive force of the compression coil spring 36 and thereby inserted into the supporting socket 38 and the pinch 35 is rectilinearly moved to the original position by the restitutive force of the compression coil spring 37 and thereby inserted into the supporting socket 38. Thus, the pinches 34, 35 and the supporting socket 38 are engaged with each other, whereby the attachment of the display means 10 to the housing means 20 is completed.

As described above, according to the display means 100 of the first embodiment, the pinches 34, 35 disposed on the housing means 20 are inserted into the supporting socket 38 formed in the display means 10 and thereby rotatably engaged with the supporting socket 38, whereby the display means 10 is engaged with the housing means 20 so as to become freely rotatable. Then, when the swing bars 41, 42 rectilinearly move the pinches 34, 35 away from the supporting socket 38 in unison with the depressions of the push buttons 43, 44 which are operated manually, the pinches 34, 35 are ejected from the supporting socket 38 to thereby disengage the display means 10 and the housing means 20 from each other, resulting in the display means 10 being detached from the housing means 20.

When the positions of the pinches 34, 35 and the supporting socket 38 are made coincident with each other under the condition that the pinches 34, 35 are rectilinearly moved in the direction in which the pinches 34, 35 are isolated from the supporting socket 38, the pinches 34, 35 are inserted into the supporting socket 38 by the restitutive force of the compression coil springs 36, 37 and thereby engaged with the supporting socket 38 so as to become freely rotatable, resulting in the display means 10 being attached to the housing means 20. Therefore, it is possible to provide the display apparatus in which the display means 10 may be attached to or detached from the housing means 20 easily and speedily.

Figure 9:
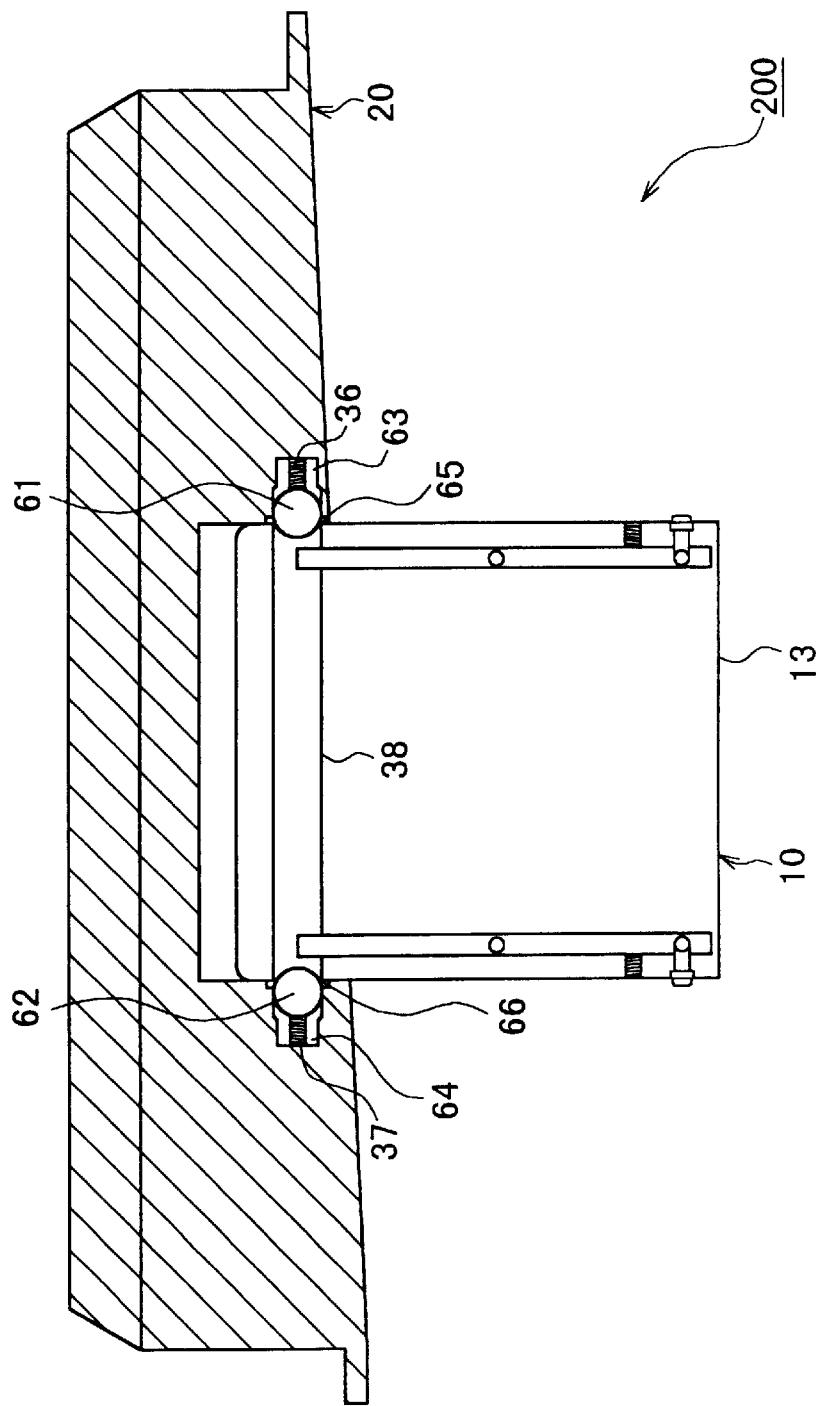
FIG. 9 is a cross-sectional view showing the inside of a display apparatus 200 according to a second embodiment of the present invention.
Figure 10:
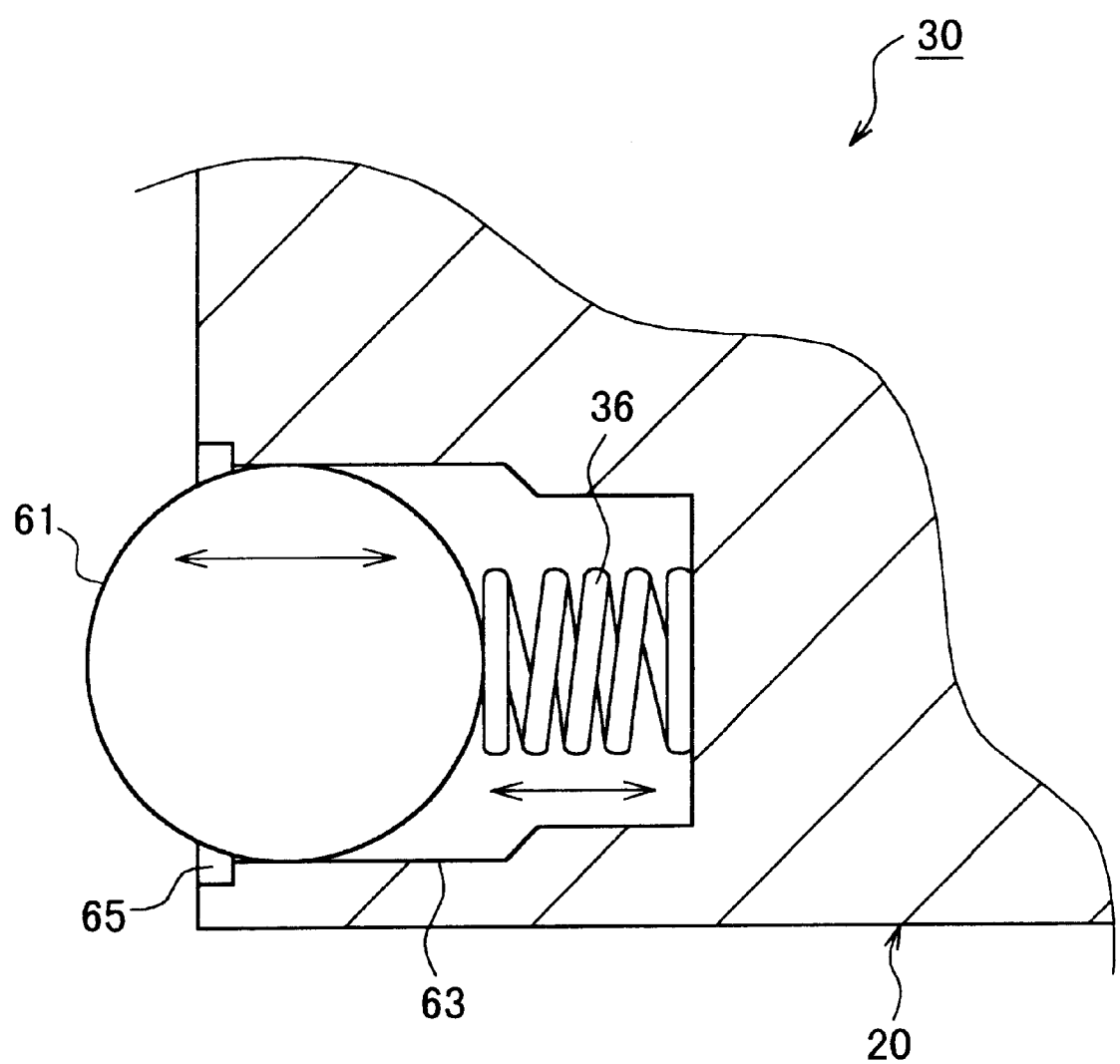
FIG. 10 is a cross-sectional view showing a supporting portion 30 of the display apparatus 200.
Figure 11:
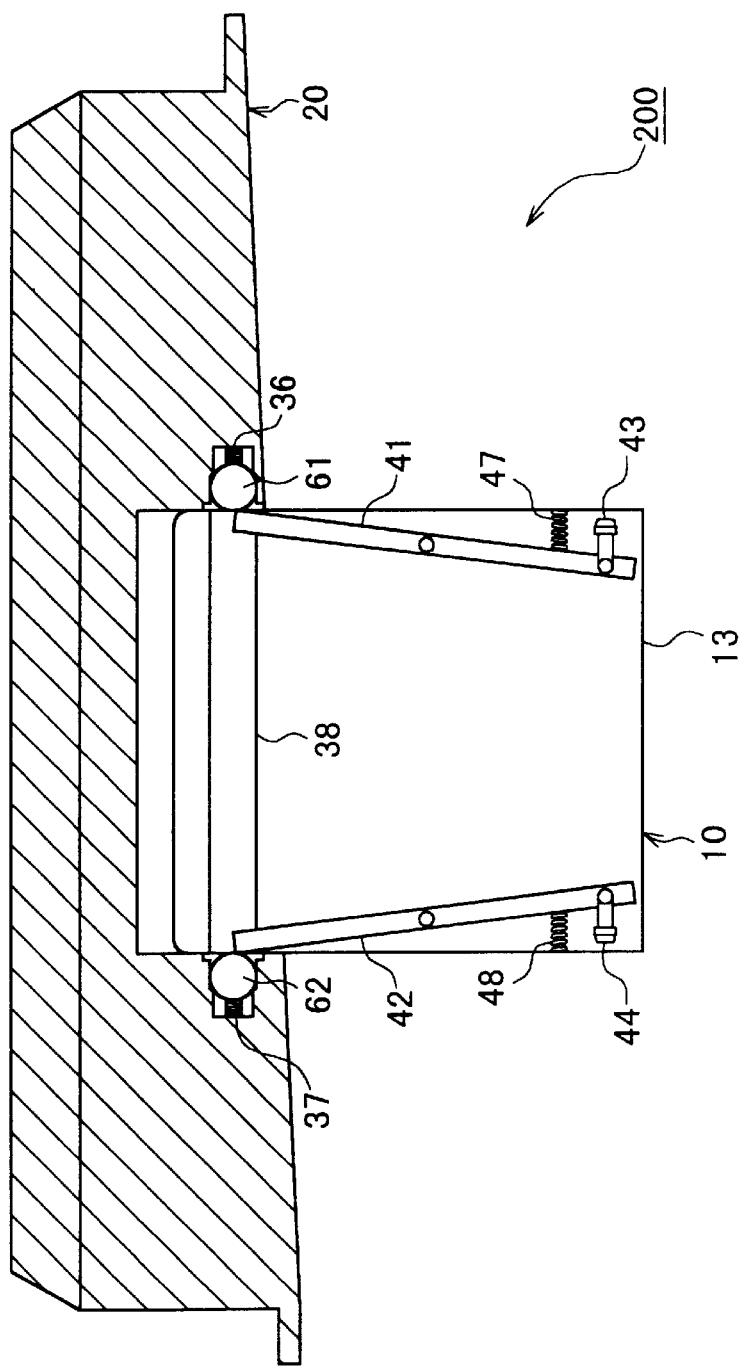
FIG. 11 is a cross-sectional view showing the manner in which the display apparatus 200 is disengaged.

(2) Second Embodiment:

FIG. 9 is a cross-sectional view showing the configuration of the inside of a display apparatus 200 according to a second embodiment of the present invention. FIG. 10 is a cross-sectional view showing the supporting portion 30 of the display apparatus 200, and FIG. 11 is a cross-sectional view showing the manner in which the display apparatus 200 is disengaged. In this embodiment, as illustrated, the supporting portion 30 includes balls 61, 62 (supporting portions), ball slots 63, 64 and ball slot lids 65, 66. In this embodiment, identical elements and parts identify the same reference numerals and the same functions, and therefore need not be described.

A display casing 13 shown in FIG. 9 is shaped such that both corner portions of its upper portion are inclined (rounded). Thus, when the display means 10 is attached to the housing means 20, the balls 61, 62 may be easily pushed into the ball sots 63, 64 by a contact force. The ball 61 is loosely fitted into the ball slot 63, and the ball 62 is loosely fitted into the ball slot 64. Also, the balls 61, 62 may be engaged with the supporting socket 38 so as to become freely rotatable. The ball slots 63, 64 are bored in the housing means 20. The ball slot lid 65 is attached to the ball slot 63, and the ball slot lid 66 is attached to the ball slot 64.

The ball 61 shown in FIG. 10, for example, has a spherical shape so that it may be rectilinearly moved by a contact force. The ball slot lid 65, for example, has an opening small than the diameter of the ball 61, and a part of the ball 61 is protruded from such opening of the ball slot lid 61 to the convex inner side surface of the housing means 20. That is, the ball 61 is inserted into the ball slot 63 through the compression coil spring 36 and the ball slot lid 65 is attached to the ball slot 63, whereby the ball 61 can be prevented from being ejected from the ball slot 63.

When the ball 61 is released from being pressed after it was moved rectilinearly by the pressing force generated by the swing motion of the swing bar 41 shown in FIG. 9, the ball 61 is rectilinearly moved to the original position by the restitutive force of the compression coil spring 36. The ball 62, the ball slot 64, the ball slot lid 66 and the compression coil spring 37 serving as the supporting portion 31 also are arranged in the same manner as described above.

An example of an operation of the display apparatus 200 according to the second embodiment of the present invention will be described new.

When a user depresses the push button 43 shown in FIG. 11 manually, the swing bar 41 is swung to press the ball 61, thereby resulting in the ball 61 and the supporting socket 38 being disengaged from each other. At that very moment, the tension coil spring 47 is expended, and the compression coil spring 36 is compressed. Also, when a user depresses the push button 44 manually, the swing bar 42 is swung to press the ball 62, thereby resulting in the ball 62 and the supporting socket 38 being disengaged from each other. At that very moment, the tension coil spring 48 is extended, and the compression coil spring 37 is compressed.

Therefore, the display means 10 and the housing means are disengaged from each other so that the display means 10 may be detached from the housing means 20. Thereafter, the swing bar 41 and the push button 43 are rectilinearly moved to the original positions by the restitutive force of the tension coil spring 41, and the swing bar 42 and the push button 44 are rectilinearly moved to the original positions by the restitutive force of the tension coil spring 48. Simultaneously, the ball 61 is moved to the original position by the restitutive force of the compression coil spring 36, and the ball 62 is moved to the original position by the restitutive force of the compression coil spring 37.

When the display means 10 is attached to the housing means 20, the inclined portions (i.e. rounded portions) of the upper two corner portions of the display housing 13 are brought in contact with the balls 61, 62, whereby the ball 61 is rectilinearly moved by a contact force in the direction in which the compression coil spring 36 is compressed. Thus, when the positions of the balls 61, 62 are made coincident with the position of the supporting socket 38, the ball 61 is rotatably engaged with the supporting socket 38 by the restitutive force of the compression coil spring 36, and the ball 62 is rotatably engaged with the supporting socket 38 by the restitutive force of the compression coil spring 37. Thus, the attachment of the display means 10 to the housing means 20 is completed.

As described above, according to the display apparatus 200 of the second embodiment, the user may detach the display means 10 from the housing means 20 by depressing the push buttons 43, 44. Also, the user may easily attach the display means 10 to the housing means 20 by using the balls 61, 62 of the spherical shape which can be rectilinearly moved by the contact force generated from the inclined (i.e. rounded) portions of the upper two corner portions of the display casing 13. Therefore, it is possible to provide a display apparatus in which the display means 10 may be attached to or detached from the housing means 20 easily and speedily.

Figure 12:
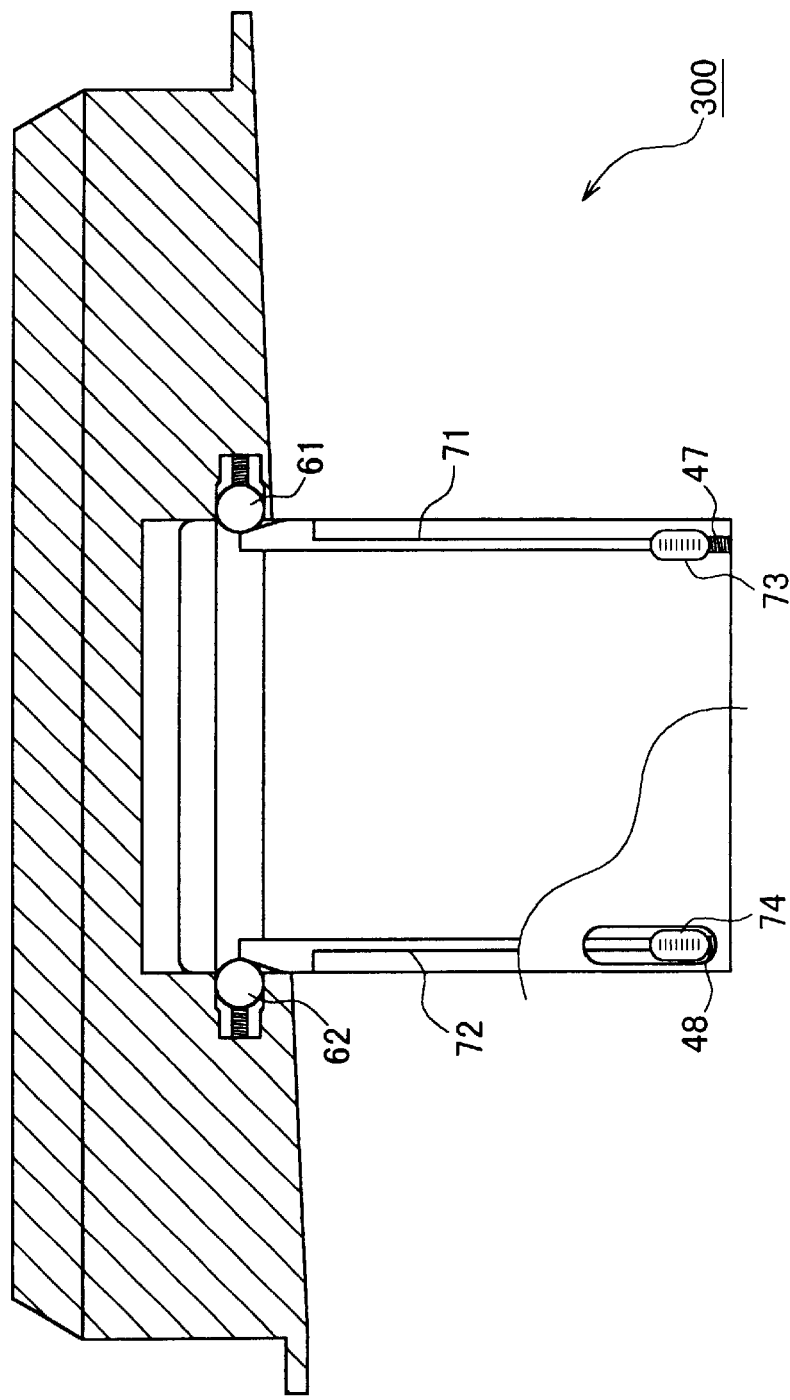
FIG. 12 is a partly-cross-sectional view showing the inside of a display apparatus 300 according to a third embodiment of the present invention.
Figure 13:
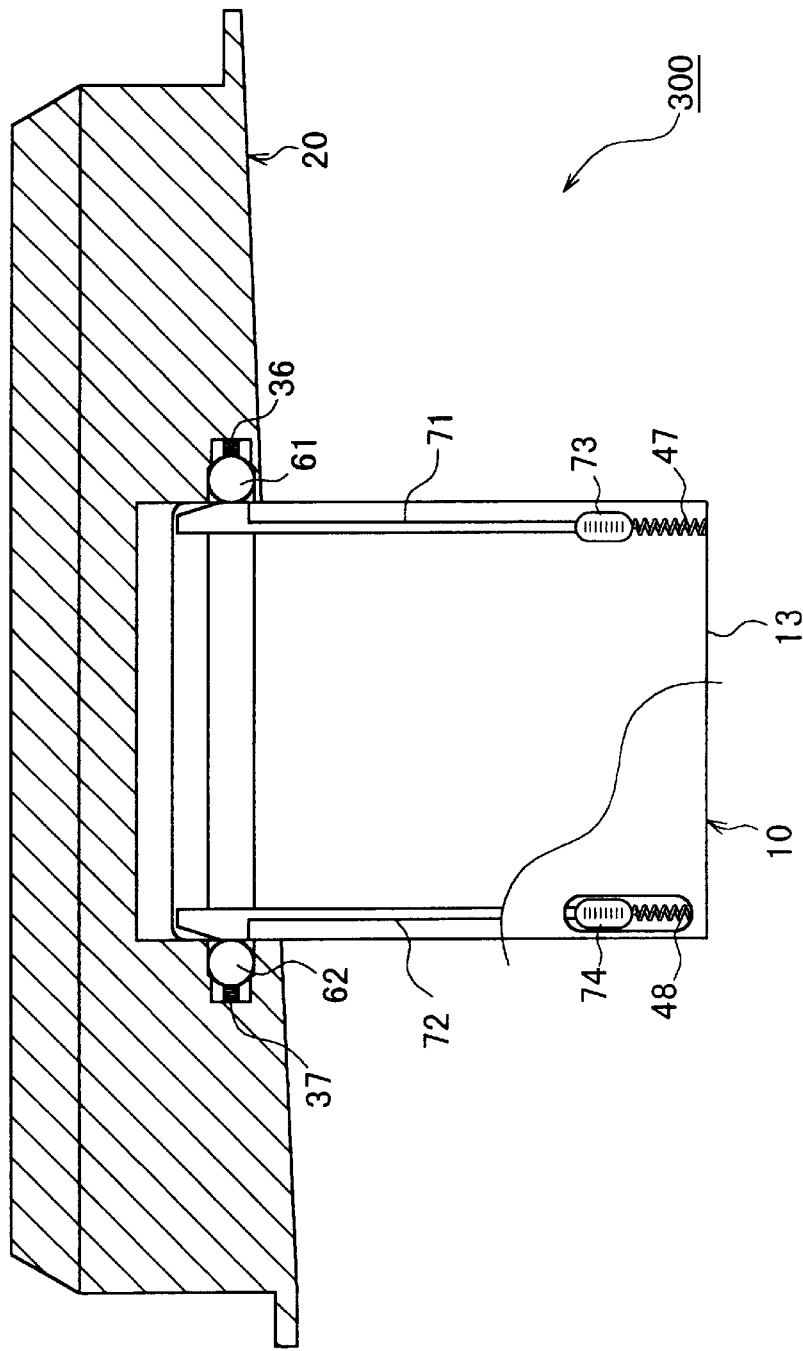
FIG. 13 is a partly-cross-sectional view showing the manner in which the display apparatus 300 is disengaged.

(3) Third Embodiment:

FIG. 12 is a partly-cross-sectional view illustrating the inside of a display apparatus 300 according to a third embodiment of the present invention. FIG. 13 is a partly-cross-sectional view illustrating the example in which the display apparatus 300 is disengaged. In this embodiment, the display apparatus 300 might be the modification of the aforementioned display apparatus 200 and might include slide bars 71, 72 (disengage portions) and slide buttons 73, 74 (disengage switches) comprising the disengage means. In FIGS. 12 and 13, elements and parts identical to those of the first and second embodiments identify the same reference numerals and the same functions, and therefore need not be described.

The slide bar 71 shown in FIG. 12, for example, has one end side surface in contact with the ball 61, for example, and its contact surface is inclined so as to press the ball 61 by a rectilinear motion. The tension coil spring 47 is attached to the other end of the slide bar 71. Also, the slide bar 72, for example, has one end side surface in contact with the ball 62, for example, and its contact surface is inclined so as to press the ball 62 by a rectilinear motion. The tension coil spring 48 is attached to the other end of the slide bar 72.

The slide buttons 73, 74, for example, are disposed on the side surface of the display casing 13. This slide button 73 is attached to the slide bar 71, and the slide button 74 is attached to the slide bar 72, each of which may be operated in the rectilinear direction manually. The slide buttons 73, 74 may be located at other suitable positions so long as they become easy to handle.

An example of an operation of the display apparatus 300 according to the third embodiment will be described next.

The slide button 73 is rectilinearly moved manually as shown in FIG. 13, whereby the slide bar 71 is moved in the rectilinear direction while the slide bar 71 is extending the tension coil spring 47. Thus, the inclined portion of the slide bar 71 rectilinearly moves the ball 61 in the direction in which the compression coil spring 36 is compressed, thereby resulting in the ball 61 and the supporting socket 38 being disengaged from each other. Also, the slide button 74 is rectilinearly moved manually, whereby the slide bar 72 is moved in the rectilinear direction while the slide bar 72 is extending the tension coil spring 48. As a consequence, the inclined portion of the slide bar 72 rectilinearly moves the ball 62 in the direction in which the compression coil spring 37 is compressed, thereby resulting in the ball 62 and the supporting socket 38 being disengaged from each other. Thus, the display means 10 may be detached from the housing means 20.

Thereafter, the slide bar 71 and the slide button 73 are rectilinearly moved to the original positions by the restitutive force of the tension coil spring 47, and the slide bar ?2 and the slide switch 74 are rectilinearly moved to the original positions by the restitutive force of the tension coil spring 48. Simultaneously, the ball 61 is rectilinearly moved to the original position by the restitutive force of the compression coil spring 36., and the ball 62 is rectilinearly moved to the original position by the restitutive force of the compression coil spring 37. Also, by the contact force using the inclined portions (i.e. rounded portions) formed on the upper two corner portions of the display casing 13, the display means 10 may be easily attached to the housing means 20.

As described above, according to the display apparatus 300 of the third embodiment, the user may detach the display means 10 from the housing means 20 by rectilinearly moving the slide buttons 73, 74. Also, the user may easily attach the display means 10 to the housing means 20 by the contact force using the inclined portions (i.e. rounded portions) formed on the upper two corner portions of the display casing 13. Therefore, it is possible to provide a display apparatus in which the display means 10 may be attached to or detached from the housing means 20 easily and speedily.

Figure 14:
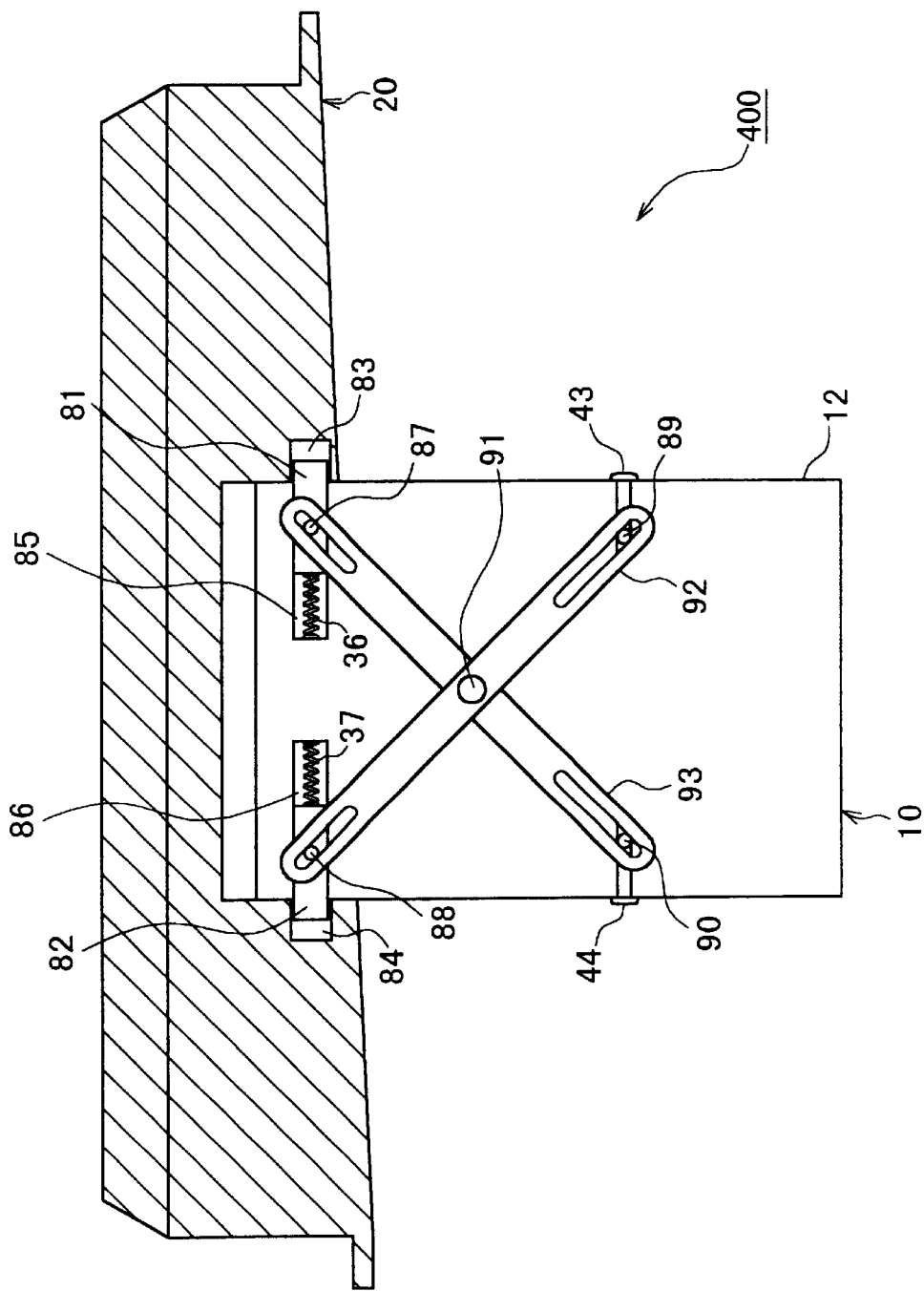
FIG. 14 is a cross-sectional view showing the inside of a display apparatus 400 according to a fourth embodiment of the present invention.

(4) Fourth Embodiment:

FIG. 14 is a cross-sectional view illustrating the configuration of-the inside of a display apparatus 400 according to a fourth embodiment of the present invention. FIG. 15 is a cross-sectional view illustrating the manner in which the display apparatus 400 is disengaged. In this embodiment, pin shafts 81, 82, for example, are provided on the display means 10 as supporting portions comprising a supporting means. Shaft sockets 83, 84, for example, are provided on the housing means 20 as a supported portion. In FIGS. 14 and 15, elements and parts identical to those of the first, second and third embodiments identify the same reference numerals and the same functions, and therefore need not be described.

The shaft sockets 83, 84 shown in FIG. 14 are formed on both side surface of the recessed inside of the housing means 20 in the opposing fashion. When the pin shaft 81 is inserted into the shaft socket 83 and the pin shaft 82 is inserted into the shaft socket 84, they are engaged with each other so as to become freely rotatable. When the pin shaft 81 is ejected from the shaft socket 83 and the pin shaft 82 is ejected from the shaft socket 84, they are disengaged from each other. The pin shaft 81 disposed on the display means 10 is loosely fitted into a pin shaft hole 85 bored similarly on the display means 10 through the compression coil spring 86 so that the pin shaft 81 may be rectilinearly moved relative to the pin shaft hole 85. A follower pin 87 is attached to the pin shaft 81.

In a like manner, the pin shaft 82 disposed on the display means 10 is loosely fitted into the pin shaft hole 86 bored similarly on the display means 10 through the compression coil spring 37 such that the pin shaft 82 may be rectilinearly moved relative to the pin shaft hole 86. A follower pin 88 is attached to the pin shaft 82.

Links 92, 93, for example, have oblong openings of predetermined lengths elongated in the link shaft directions at the positions near respective ends thereof. The links 92, 93 are crossed by predetermined respective end segments, and are engaged with the display casing 12 at the intersection point by a fulcrum pin 91. A follower pin 89 attached to the push button 43 is inserted into the opening bored at one end of the link 92. A follower pin 88 attached to the pin shaft 82 is inserted into the opening bored at the other end of the link 92.

A follower pin 90 attached to the push button 44 is inserted into the opening bored at one end of the link 93, and a follower pin 87 attached to the pin shaft 81 is inserted into the opening bored at the other end of the Link 93. That is, when the user depresses the push button 43 manually, the pin shaft 82 may be rectilinearly moved away the shaft socket 84. Similarly, when the user depresses the push button 44 manually, the pin shaft 81 may be rectilinearly moved away from the shaft socket 83.

An example of an operation of the display apparatus 400 according to the fourth embodiment of the present invention will be described next.

When the user depresses the push button 43 shown in FIG. 15 manually, the link 92 is operated in unison with the depression of the push button 43 to thereby rectilinearly move the pin shaft 82 in the direction in which the compression coil spring 37 is compressed. Also, when the user depresses the push button 44 manually, the link 93 is operated in unison with the depression of the push button 44 to thereby rectilinearly move the pin shaft 81 in the direction in which the compression coil spring 36 is compressed. As a result, the pin shaft 81 is ejected from the shaft socket 83 and the pin shaft 82 is ejected from the shaft socket 84, thereby resulting in the pin shaft 81 and the shaft socket 83 being disengaged from each other and the pin shaft 82 and the shaft socket 84 being disengaged from each other. Therefore, the display means 10 and the housing means 20 are disengaged from each other, whereby the display means 10 may be detached from the housing means 20. Thereafter, when the user releases the push button 43 from being operated manually, the pin shaft 82, the link 92 and the push button 43 are moved to the original positions by the restitutive force of the compression coil spring 37. Also, when the user releases the push button 44 from being operated manually, the pin shaft 81, the link 93 and the push button 44 are moved to the original positions by the restitutive force of the compression coil spring 36.

Under the condition that the display means 10 is detached from the housing means 20, according to this embodiment, when the user depresses the push button 43 manually, the pin shaft 82 is rectilinearly moved in the direction in which the compression coil spring 37 is compressed. Also, when the user depresses the push button 44 manually, the pin shaft 81 is rectilinearly moved in the direction in which the compression coil spring 36 is compressed.

While the user is depressing the push button 43, the position of the pin shaft 81 disposed on the display means 10 and the position of the shaft socket 83 bored on the housing means 20 are made coincident with each other. Similarly, while the user is depressing the push button 44, the position of the pin shaft 82 disposed on the display means 10 and the position of the shaft socket 84 bored on the housing means 20 are made coincident with each other. Then, when the user releases the push buttons 43, 44 from being depressed manually, the pin shaft 81 is inserted into the shaft socket 83 and the pin shaft 82 is inserted into the shaft socket 84 and thereby rotatably engaged with each other. Thus, the display means 10 may be attached to the housing means 20 with ease.

As described above, according to the display -apparatus 400 of the fourth embodiment, when the user depresses the push buttons 43, 44 manually, the display means 10 may be detached from the housing means 20. Also, when the user depresses the push buttons 43, 44 again, the display means 10 may be attached to the housing means 20 with ease. Therefore, it is possible to provide a display apparatus in which the display means 10 may be attached to or detached from the housing means 20 easily and speedily.

As set forth above, according to the present invention, the display apparatus includes the supporting means comprising the supporting portion and the supported portion for rotatably engaging the display means with the housing means and the disengaging means for disengaging the engagement between the display means and the housing means by isolating the supporting portion and the supported portion from each other. According to the above-mentioned arrangement, the display means may be attached to or detached from the housing means easily and speedily. Therefore, the display means may be changed and maintained with ease.

The present invention is very suitable for use with the display apparatus disposed on the wall, the ceiling or the like within the passenger cabin of the airplane or the like.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A display apparatus comprising:

display means;

housing means for housing the display means;

supporting means for detachably engaging the housing means and the display means and for rotatably engaging the display means and the housing means; and disengaging means for disengaging the engagement between the display means and the housing means, wherein the supporting means includes a supporting portion and a supported portion, and wherein the display means and the housing means are engaged with each other when the supporting portion and the supported portion are engaged with each other, and wherein the disengaging means rectilinearly moves the supporting portion in the direction in which the supporting portion comes away from the supported portion to thereby disengage the engagement between the display means and the housing means, and wherein the disengaging means includes one of, a disengaging switch to be operated and a disengaging portion for rectilinearly moving the supporting portion away from the supported portion in unison with the disengaging switch when the disengaging switch is operated, wherein the disengaging means moves the supporting portion away from the supported portion rectilinearly, and a slide switch to be operated and a slide bar for rectilinearly moving the supporting portion away from the supported portion in unison with the slide switch, wherein when the slide switch is operated the disengaging means rectilinearly moves the supporting portion away from the supported portion.

2. In a method of handling a display apparatus comprising display means, housing means having a predetermined shape for housing the display means, supporting means for detachably engaging the housing means and the display means and for rotatably engaging the display means and the housing means, disengaging means for disengaging the display means and the housing means, the supporting means including a supporting portion and a supported portion, the method comprising the steps of:

disengaging the display means and the housing means from each other when the disengaging means rectilinearly moves the supporting portion away from the supported portion, wherein the disengaging step comprises one of, operating a disengaging switch provided on the disengaging means, thereby rectilinearly moving, via a disengaging portion provided on the disengaging means, the supporting portion away from the supported portion in unison with the disengaging switch, and operating a slide switch provided on the disengaging means, thereby rectilinearly moving, via the slide bar provided on the disengaging means, the supporting portion away from the supported portion in unison with the slide switch;

the method further comprising the steps of, rectilinearly moving the supporting portion to the original position when the disengaging means is released from being operated;

moving the supporting portion away from the supported portion after the supporting portion was rectilinearly moved to the original position; and further moving the supporting portion in the engagement direction so that the display means and the housing means are engaged with each other.

* * * * *